United States Patent [19]

Matsuura et al.

[11] Patent Number: 4,645,356

[45] Date of Patent: Feb. 24, 1987

[54] WRISTWATCH

[75] Inventors: Eiichi Matsuura, Chiba; Nobuo Tsukada, Tokyo, both of Japan

[73] Assignee: Seiko Instruments & Electronics Ltd., Tokyo, Japan

[21] Appl. No.: 763,879

[22] Filed: Aug. 8, 1985

Related U.S. Application Data

[63] Continuation of Ser. No. 633,064, Jun. 20, 1984, abandoned, which is a continuation of Ser. No. 572,593, Jan. 19, 1984, abandoned, which is a continuation of Ser. No. 315,466, Oct. 27, 1981, abandoned, which is a continuation of Ser. No. 128,288, Mar. 7, 1980, abandoned, which is a continuation of Ser. No. 756,989, Jan. 5, 1977, abandoned, which is a continuation of Ser. No. 566,348, Apr. 9, 1975, Pat. No. 4,012,899.

[30] Foreign Application Priority Data

Apr. 23, 1974 [JP] Japan .................................. 49-45789
Apr. 29, 1974 [JP] Japan .................................. 49-40344

[51] Int. Cl.⁴ .......................... G04F 5/00; H02K 7/00
[52] U.S. Cl. .................................... 368/160; 368/204; 310/40 MM
[58] Field of Search ....... 310/40 R, 40 MM, 162–164; 368/76, 80, 88, 155–157, 160, 276, 299, 300

[56] References Cited

U.S. PATENT DOCUMENTS

| | | | |
|---|---|---|---|
| 1,955,588 | 4/1934 | Knopp | 310/163 |
| 1,992,826 | 2/1935 | Karasawa | 310/163 |
| 2,027,944 | 1/1936 | Whitehead et al. | 310/163 |
| 2,066,680 | 1/1937 | Gieskieng et al. | 310/162 |
| 2,793,307 | 5/1957 | Gallagher | 310/164 |
| 3,403,272 | 9/1968 | Dold | 310/162 |
| 3,449,904 | 6/1969 | Waldburger et al. | 368/160 |
| 3,782,101 | 1/1974 | Kuffer | 368/160 |
| 4,012,899 | 3/1977 | Matsuura et al. | 368/204 |

FOREIGN PATENT DOCUMENTS 1060702  3/1967  United Kingdom .............. 368/160

Primary Examiner—Vit W. Miska
Attorney, Agent, or Firm—Robert E. Burns; Emmanuel J. Lobato; Bruce L. Adams

[57] ABSTRACT

A wristwatch comprises a watch movement having an outwardly curved frame portion, and a micro motor mounted on the watch movement. The micro motor comprises a curved magnetic core, a coil wound on the magnetic core, and a stator connected to the magnetic core to define therewith a closed magnetic flux path and having an opening therein in which a rotor is rotatably disposed. The magnetic core is curved outwardly with a curvature similar to and conforming to that of the outwardly curved frame of the watch movement, and the curved magnetic core overlies the curved frame of the watch movement so that no wasted space exists therebetween. The stator comprises a pair of stator pieces each connected at one end to a respective end portion of the curved magnetic core and the stator pieces have curved side edge portions extending at least partly along the curvature of said curved mangetic core to thereby form a compact overall assembly.

8 Claims, 5 Drawing Figures

WRISTWATCH

This is a continuation of application Ser. No. 633,064 filed June 20, 1984 which is a continuation of application Ser. No. 572,593 filed Jan. 19, 1984 which is a continuation application of application Ser. No. 315,466, filed Oct. 27, 1981 which is a continuation of application Ser. No. 128,288 filed on Mar. 7, 1980 which is a Rule 60 continuation application of Ser. No. 756,989 filed on Jan. 5, 1977, all abandoned which is a Rule 60 divisonal application of Ser. No. 566,348 filed on Apr. 9, 1975, now U.S. Pat. No. 4,012,899.

BACKGROUND OF THE INVENTION

This invention relates to a micro motor for an electronic timepiece, and having a core member which has a coil winding, a movement, and wherein the core member is curved along the curved outer shape of said movement.

In the conventional type timepiece motor as indicated in FIG. 1, the core member "C" has a coil winding wound thereon and is constructed in a straight shape. Since the outer periphery of the timepiece movement "M" is curved, a cavity portion "SP" exists between said outer periphery portion and said core member "C". It has proven very difficult to effectively use said cavity portion "SP" because it is very irregular and narrow in shape.

Further, the space for housing the micro motor is restricted and obstructs the performance of the transducer.

OBJECT OF THE INVENTION

The present invention aims at eliminating the above noted difficulty and insufficiency, and therefore it is the primary object of the present invention to provide a micro meter for an electronic timepiece, a core member which has a coil winding in said micro motor is curved along the curved outer shape of said movement.

Further object of this invention is to provide a small type watch which has said micro motor, and to provide a high performance of said micro motor.

SUMMARY OF THE INVENTION

According to the present invention, there is a micro motor for an electronic timepiece and wherein: a core member which has a coil winding, a rotor which is rotatably positioned between a pair of stators, and a movement which has a gear train, said core member is curved along the curved outer shape of said movement, therefore a small watch is easily obtained.

BRIEF DESCRIPTION OF THE DRAWINGS

The above and advantages of the present invention will become more obvious from the following description when taken in connection with the accompanying drawings which show the preferred embodiments of the invention, and wherein.

DETAILED DESCRIPTION OF THE INVENTION

Figure 1:
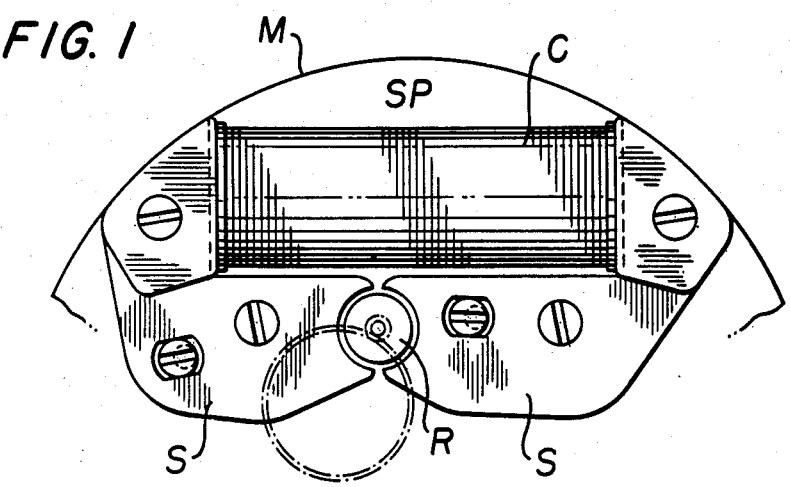
FIG. 1 shows a flat plan view of the micro motor in conventional type.
Figure 2:
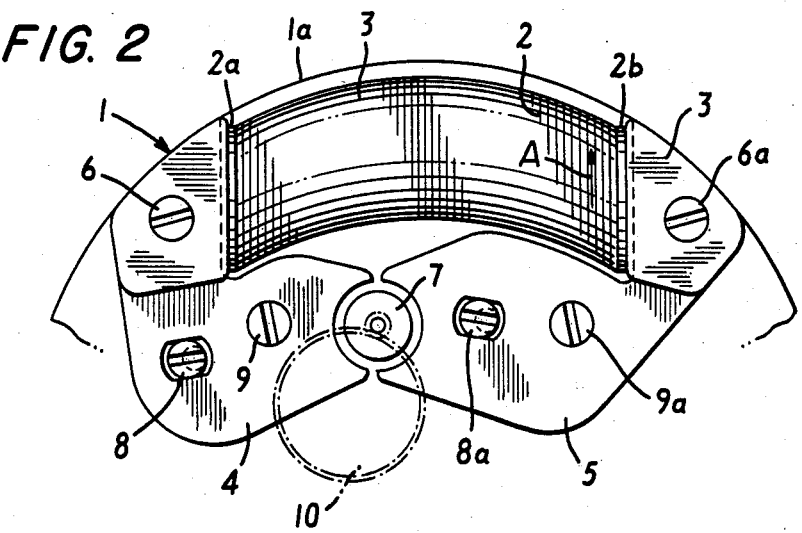
FIG. 2 shows a flat plan view of the one embodiment of the micro motor of the present invention.

Referring now to the accompanying drawings, FIG. 2 shows the first embodiment of a micro motor, an outer periphery $1a$ of a movement 1 is shaped to a curved shape, a core member 3 which has a coil winding 2 is constructed by winding the coil to said core member 3 in direction of "A". Said core member 3 is curved along the outer periphery $1a$ of said movement 1, and then it is set that a space area between said outer periphery $1a$ and said core member 3 is no existence. The flange portions $2a$ and $2b$ of said core member 3 are disposed in parallel relation each other and further the winding direction "A" of said coil 2 is parallel with said flange portion $2a$. Therefore, since the winding direction is same to the conventional type of the core member of the straight shape, and it is very useful that the winding operation is very easy and the winding shape of said coil 2 is aligned to be same between the inner side and the outer side.

Numerals 6 and $6a$ are the screw bolts for coupling said core member 3 to said stators 4 and 5, numeral 7 is a rotor which is rotatably mounted, numeral 8 and $8a$ are the concentric pins for adjusting the air gap of said stators 4 and 5 to said rotor 7, numeral 9 and $9a$ are the mounting screw bolts of said stators 4 and 5, further numeral 10 is a gear wheel which gears to a pinion of said rotor 7.

Figure 3:
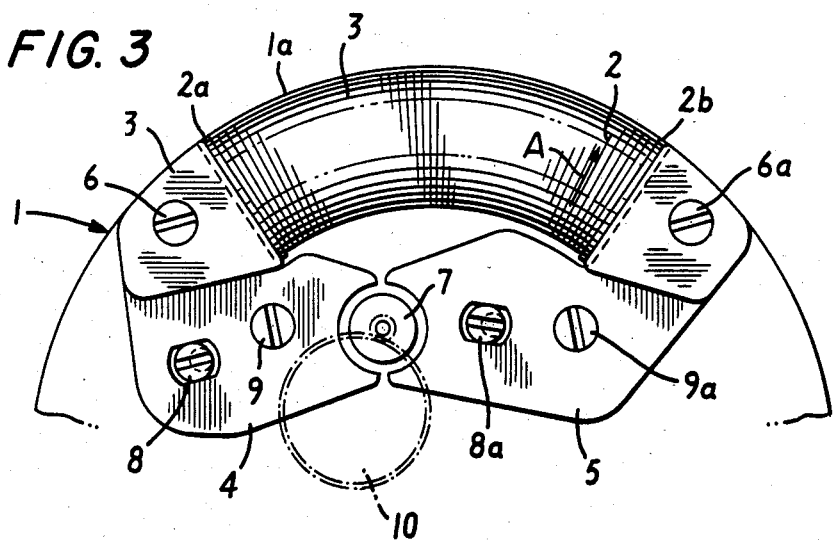
FIG. 3 shows a flat plan view of the another embodiment of the micro motor of the present invention.

Referring now to the second embodiment of the present invention in FIG. 3, an outer periphery $1a$ of a movement 1 is shaped to a curved shape, a core member 3 which has a coil winding 2 is constructed by winding the coil to said core member 3 in direction of "A". Said core member 3 is curved along the outer periphery $1a$ of said movement 1, and then it is clear that said space area between said outer periphery $1a$ and said core member 3 is no existence.

The flange portions $2a$ and $2b$ of said core member 3 and the winding direction "A" in said core member in FIG. 3 are set in the normal line direction to that curved line of said movement 1. It is very useful that the winding operation is very easy and the coil shape is easily stabilized, further the shape of the coupling portion in said core member 3 and the stators 4 and 5 are effectively used along the flow of the flux.

Numerals 6 and $6a$ are the screw bolts for coupling said core member 3 to said stators 4 and 5, numeral 7 is a rotor which is rotatably mounted, numerals 8 and $8a$ are an eccentric pins for adjusting the air gap of said stators 4 and 5 to said rotor 7, numerals 9 and $9a$ are the mounting screw bolts of said stators 4 and 5, further numeral 10 is a gear wheel which gears to a pinion of said rotor 7.

Since said core member 3 which has the coil winding 2 is curved along the curved outer periphery of said movement 1, the space of said movement is effectively utilized.

As shown in the embodiments of FIGS. 2 and 3, the micro motor comprised of the curved core 3 having wound thereon the coil 2, the stator pieces 4 and 5, and the rotor 7 is dimensioned so as to overlie an area which is not more than about one third the area circumscribed by the watch movement. In other words, if the complete circular outline of the movement were shown in the drawings, the area occupied by the micro motor would not be greater than about one third that of the circle which circumscribes the watch movement.

Figure 4:
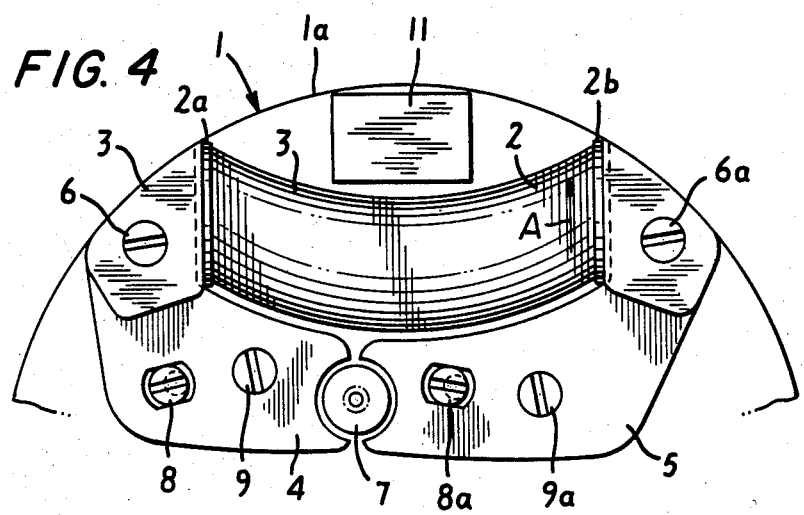
FIG. 4 and FIG. 5 respectively show the another embodiment of the micro motor of the present invention.
Figure 5:
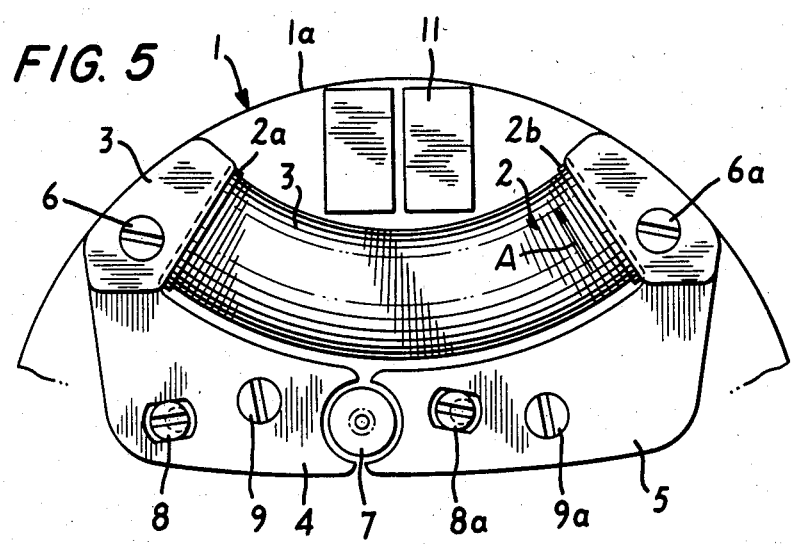

Referring now to the third embodiment of the micro motor of the present invention, in FIG. 4 and FIG. 5, an outer periphery 1a of a movement 1 is shaped to a curved shape, a core member 3 which has a coil winding 2 is constructed by winding the coil to said core member 3 in direction of "A". Said core member 3 is curved to a center direction of said movement 1. The space area 1b is shaped between said outer periphery 1a and said core member 3. The flange portions 2a and 2a of said core member 3 are disposed in parallel relation each other and further the winding direction "A" of said coil 2 is parallel with said flange portion 2a. Therefore, since the winding direction is same to the conventional type of the core member of the straight shape, and it is the merit that the winding operation is very easy and the winding shape of said coil 2 is aligned to be same between the inner side and the outer side. Since said flange 2a and said winding direction "A" in said core member 3 in FIG. 5 are set in the normal line direction to that curved line of said core member 3, it is the merit that the winding operation is very easy and the coil shape is easily stabilized and further the shape of the coupling portion in said core member 3 and the stators 4 and 5 are effectively used along the flow of the flux.

Numerals 6 and 6a are the coupling screw bolts for coupling said core 3 and said stators 4 and 5, numeral 7 is a rotor which is rotatably mounted to said movement, numerals 8 and 8a are the eccentric pins for adjusting the air gap of said stators 4 and 5 to said rotor 7, numerals 9 and 9a are the mounting screw bolts of said stators 4 and 5, further numeral 11 is an electrical element such as condenser which is disposed to said space area 1b.

Since said space area 1b is formed by said core member 3 which has the coil winding 2 is curved to the center direction of said movement, the using efficiency of said space in said movement is stepped up, especially the effect is remarkable in a larger movement.

Furthermore, in FIG. 5, said flange portions 2a and 2b of said core member 3 are disposed in non-parallel relation each other, and said electrical element 11 is positioned to said space area 1b.

Since said electrical element such as the condenser is housed to said space area as the lump, therefore the block-form of said electrical element is speedily attained and the realization of the small switch is easily and instantaneously obtained.

What is claimed is:

1. In a wristwatch: a watch movement having an outwardly curved frame portion; and a micro motor mounted on said watch movement and configured in relation thereto to obtain efficient space utilization of the space within the watch, said micro motor comprising a one-piece curved magnetic core mounted on the watch movement frame portion at the periphery thereof and being curved outwardly along substantially its entire length, the curved magnetic core having an outward side the curvature of which conforms to and extends along the outwardly curved frame portion to effectively eliminate wasted space which would otherwise exist between the core and watch movement if the core were straight rather than curved, and an inward side the curvature of which is the same as that of the outward side, a coil winding wound on said curved magnetic core along substantially the entire length thereof, a stator comprised of two stator pieces each connected at one end to a respective end portion of said curved magnetic core to define therewith a magnetic flux path and having their other ends spaced apart and configured so as to form a rotor opening therebetween, each stator piece comprising a one-piece structure having a connecting portion connected to one of the end portions of the curved magnetic core, and a projecting portion projecting into the concavity defined by the curved inward side of the curved magnetic core and extending toward the projecting portion of the other stator piece, each projecting portion having a curved side edge portion the curvature of which conforms to and extends at least partly along the curved inward side of the curved magnetic core, and a rotor rotatably disposed in said rotor opening.

2. A wristwatch according to claim 1; wherein the end portions of said curved magnetic core have flange portions disposed in parallel relationship with one another.

3. A wristwatch according to claim 2; wherein said coil winding is wound on said curved magnetic core in a winding direction parallel to said flange portions.

4. A wristwatch according to claim 1; wherein the end portions of said curved magnetic core have flange portions disposed in non-parallel relationship with one another.

5. A wristwatch according to claim 4; wherein said coil winding is wound on said curved magnetic core in a winding direction normal to the line of curvature of said outwardly curved frame portion of said watch movement.

6. A wristwatch according to claim 1; wherein said curved magnetic core extends along and substantially overlies a part of the outer periphery of said curved frame portion with essentially no space therebetween.

7. A wristwatch according to claim 1; wherein said side edge portions of said stator pieces lie closely adjacent said curve magnetic core on the inward side thereof to effectively eliminate wasted space between the core and stator pieces which would otherwise exist if the stator piece side edge portions did not extend at least partly along and lie closely adjacent the curved magnetic core.

8. A wristwatch according to claim 1; wherein the micro motor is dimensioned so as to overlie an area not more than about one third the area circumscribed by the watch movement.

* * * * *